H. E. GOVE.
FIRELESS COOKER.
APPLICATION FILED AUG. 12, 1912.
1,101,024.
Patented June 23, 1914.
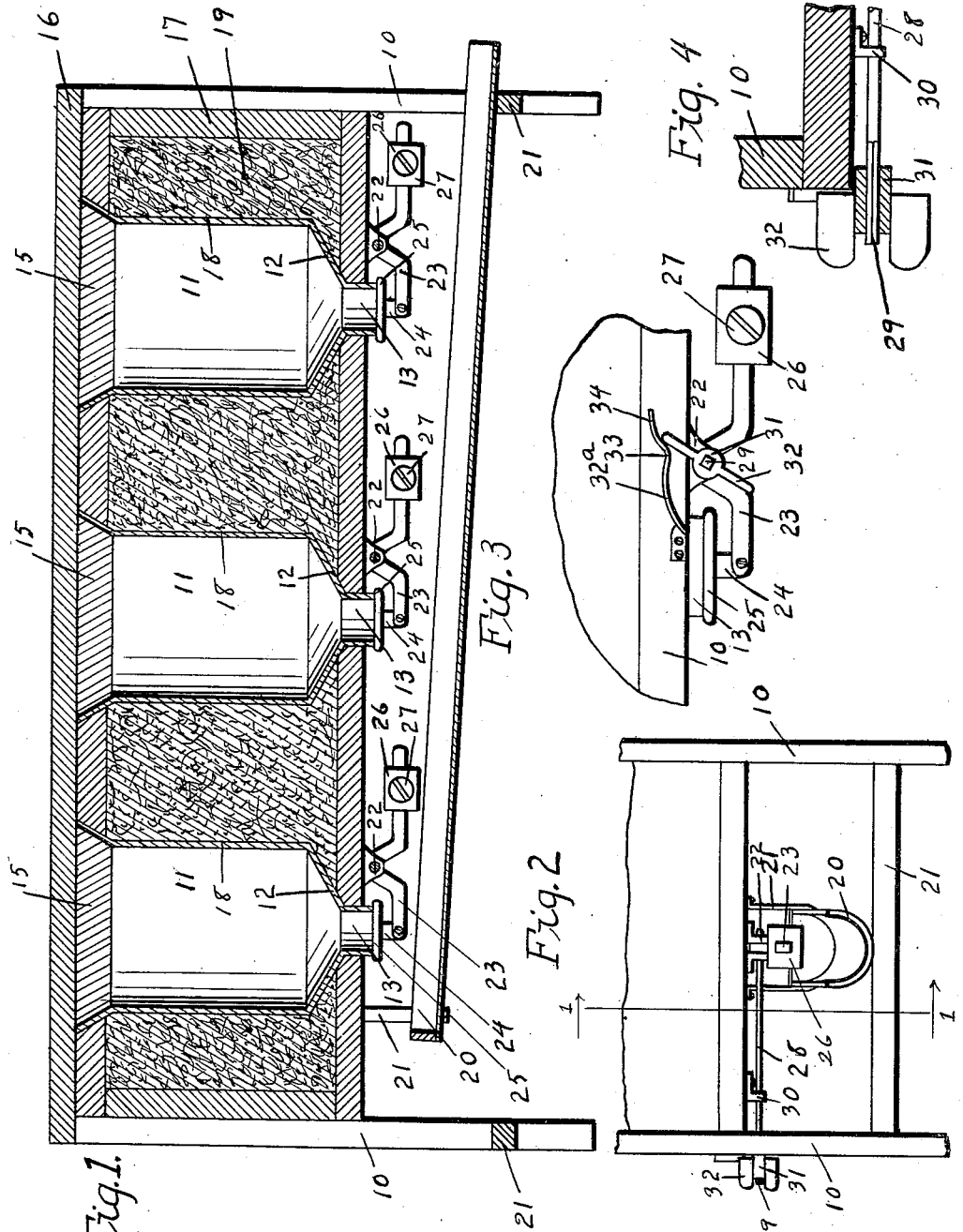
Witnesses.
L. C. Paley.
A. G. Hague.
Inventor.
Harry E. Gove.
by Orwig & Bair Atty's
COLUMBIA PLANOGRAPH CO., WASHINGTON, D. C.

UNITED STATES PATENT OFFICE.

HARRY E. GOVE, OF NEWTON, IOWA.

FIRELESS COOKER.

1,101,024.

Specification of Letters Patent.

Patented June 23, 1914.

Application filed August 12, 1912. Serial No. 714,739.

*To all whom it may concern:*

Be it known that I, HARRY E. GOVE, a citizen of the United States, residing at Newton, in the county of Jasper and State of Iowa, have invented a new and useful Fireless Cooker, of which the following is a specification.

The object of my invention is to provide a fireless cooker having a frame and a receptacle for food having an opening in its lower end and provided with a suitable valve for controlling said opening for discharging the water of condensation.

A further object is to provide a cooker with an opening in its lower end and a valve to co-act therewith, which valve may be regulated by discharging the water when the latter has reached a certain predetermined height in the cooker.

A further object is to provide a fireless cooker having such an opening and such a valve, and provided with mechanism for manually operating the valve and for securing said valve by yielding pressure in its open or closed position.

My invention consists in certain details, in the construction, arrangement and combination of the various parts of the device, whereby the objects contemplated are attained, as hereinafter set forth, pointed out in my claims and illustrated in the accompanying drawings in which—

Figure 1 shows a longitudinal, vertical, sectional view of a fireless cooker embodying my invention, taken on the line 1—1 of Fig. 2. Fig. 2 shows an end view of the lower part of my improved fireless cooker. Fig. 3 shows a detail view of the valve and its controlling mechanism taken from the side of the cooker. Fig. 4 shows a detailed sectional view of a part of the valve controlling mechanism.

In the accompanying drawings I have used the reference numeral 10 to indicate generally the frame of my improved fireless cooker.

I preferably build my cooker with three compartments 11, the walls 12 of which at the lower end thereof are inclined toward a central point as shown in Fig. 1. Each compartment is provided with a central opening or discharge passage 13 in the center of its lower end. The walls of the fireless cooker may be of any suitable construction.

I preferably provide a separate cover 15 for each of the compartments 11 made of heat insulating material. I prefer also a single large cover 16 to cover the whole cooker. As is usual in fireless cookers, I provide an outer wall 17 and an inner wall 18 for each receptacle, and provide heat insulating material 19 between the outer and inner walls. Below the openings 13 I provide an inclined drain trough 20 of suitable material and construction for carrying off water and the like discharged from the receptacle 11. The trough 20 is removably mounted on brackets 21 on the frame of the cooker. For co-acting with the openings or passages 13 and for controlling the discharge of liquids or other material therefrom, I provide for each of the receptacles 11 a valve and controlling mechanism therefor described as follows: Pivoted in a bracket 22 which extends downwardly from the lower surface of the body of the cooker is a lever arm 23. Secured to one end of the lever arm 23 on one side of the bracket 22 is a valve stem 24 on the end of which is a valve 25 designed to co-act with and control the opening 13. The other end of the lever arm 23 extends in the opposite direction from the bracket 22 and on it is slidably mounted a weight 26 which is detachably fixed on the lever arm 23 by means of a set screw 27.

It will readily be seen that by adjusting the position of the weight 26 on the free end of the pivoted lever arm 23 the valve 25 may be regulated or adjusted so that it will automatically open when certain predetermined amount of liquid such as water of condensation has collected in the lower end of receptacle 11 and a certain predetermined weight is thereby imposed upon the valve. It will of course be seen that the valve will also open whenever a predetermined steam pressure is reached within the receptacle 11. In this connection it may be noted that water of condensation may form in the receptacle 11 in various ways. A pail or cooking vessel may be placed in the receptacle and the steam therefrom will gradually condense, and the water thus formed will flow to the bottom of the receptacle.

It is not my purpose to claim or confine myself to the particular form or construction of the receptacle for cooking food disclosed and described herein.

It will readily be seen that my invention lies in the construction of the valve and its controlling mechanism, and that by very slight modifications which would not depart from the spirit of my invention as disclosed in the appended claims, my valve and controlling mechanism could be used with any other ordinary construction of a fireless cooker.

For controlling my valve more effectually I have provided the following mechanism: The bracket 22 herein before mentioned is preferably bifurcated as shown in Fig. 2. The lever arm 23 is preferably pivoted between the downwardly extending arms of the bracket 22 by means of a rod 28 which is pivoted in the arms of the bracket 22, and on which the lever arm 23 is fixed. The rod 28 extends transversely beyond the side of the cooker and its outer end 29 is angular as shown in Fig. 4. For supporting the outer end of the rod 28 and holding it in proper position the rod 28 is extended through a bracket 30 which extends downwardly from the under surface of the cooker and in which said rod 28 is loosely mounted. Slidably mounted on the angular end of the rod 28 is a block 31 formed on which are opposite side wings 32. The block 31 and the wings 32 thereon may be similar in shape to the head of a winged thumb screw. The opening in the block 31 by which said block is slidably mounted on the angular end 29 of the rod 28 is preferably of such size that the block 31 engages the end 29 with considerable friction so that the block 31 will not slide on the end 29 without the exercise of some force.

Fixed on the side of the cooker adjacent to the outer end of the rod 28 is a spring having an upwardly curved portion 32ª, a downwardly curved portion 33 and at its free end an upwardly curved portion 34. The spring is so arranged with relation to the wings 32 that when the valve 25 is closed and the block 31 is at the inward limit of its movement on the end 29 of the block 28, one of the wings 32 will rest just below and be firmly engaged by the upwardly curved portion 34 of the spring as shown in Fig. 3 in such a manner as to yieldingly hold the valve 25 in its closed position. By turning the wing 32 just referred to past the downwardly extending portion 33 of the spring until it is received in the upwardly curved portion 32ª of said spring, said wing 32 will be engaged by said spring and firmly held in position.

During the last described operation, the rod 28 serves as a rock shaft for operating the lever arm 23 and thereby operating the valve 25 which is held in its open position by the spring. The spring can be made wholly inoperative by sliding the block 31 outwardly on the angular end 29 of the rod 28 until the wings 32 are beyond the point where they engage the portion above described.

In the practical operation of my fireless cooker a receptacle for food may be placed in one of the cooking receptacles 11. The valve 25 is normally held closed by means of the weight 26. By adjusting the position of the weight 26 on the lever arm 23 the water of condensation which may collect in the cooker may be kept in any desired predetermined height. The valve may be yieldingly locked in its closed position by sliding the wings 32 inwardly until one of them is engaged by the portion 34 of the spring.

One of the disadvantages of most fireless cookers is the difficulty experienced in thoroughly cleaning them and keeping them in a wholesome and sanitary condition. My fireless cooker may be easily and quickly and thoroughly cleaned. The covers 15 and 16 are readily removed, the valve 25 may be locked in its closed position, by means of the wing 32, and the operation heretofore described. Water or water and sand, or any suitable liquid for cleaning may be poured into the receptacle 11 and the latter may be thoroughly cleaned. Boiling water may be poured therein and the receptacle scalded. By sliding the block 31 outwardly on the angular end 29 of the rod 28 the wing 32 may be released from an engagement with the spring and the valve may be manually opened. If it is desired to flush the receptacle 11 and to hold the valve 25 open during that operation then instead of sliding the block 32 outwardly it may be readily removed from the position shown in Fig. 3 to its position where one of the wings 32 is received in the upwardly curved portion 32ª of the springs when the valve will be yieldingly held in its open position.

The advantages of such a device as those disclosed in my fireless cooker include the ease and readiness with which water of condensation may be discharged and with which the time of such discharge with relation to the amount of liquid in the cooker may be regulated or controlled. Another advantage lies in the mechanism for yieldingly securing the valve 25 either in its open or closed position whereby the cooker may be readily cleaned.

I claim as my invention:

1. In a fireless cooker, the combination of a frame and a receptacle for food therein provided with a central opening in its lower end with a valve designed to coact with said opening, means for manually operating said valve, and yielding means whereby said last named means may be secured in different positions of its movement for securing said valve either in its closed or in its opened position, said operating means being so arranged that it may be readily moved out of operative relation with said yielding means.

2. In a fireless cooker, the combination of a frame and a receptacle for food mounted therein and provided with a detachable cover and with an opening in its lower end, with a valve designed to co-act with said opening, a lever arm operatively connected with said valve, a rod fixed to said lever arm and rotatably mounted on said frame, a winged block slidably and nonrotatably mounted on the free end of said rod, a spring mounted on said frame adjacent to the free end of said rod and provided with upwardly curved portions so located and arranged that when said block is in one position of its sliding movement, a wing on said block may be turned to be received in one of said upwardly curved portions of said spring for holding said valve in its open position, or may be turned in position to be received in another of said upwardly curved portions for holding said valve in its closed position.

Des Moines, Iowa, July 30, 1912.

HARRY E. GOVE.

Witnesses:
SARA ROBINSON,
LILLIAN COOK.

Copies of this patent may be obtained for five cents each, by addressing the "Commissioner of Patents, Washington, D. C."